United States Patent
Tang et al.

(10) Patent No.: US 11,060,016 B2
(45) Date of Patent: Jul. 13, 2021

(54) EASILY DISPERSIBLE POLYMER POWDER FOR HYDROCARBON EXTRACTION

(71) Applicant: ChemEOR, Inc., Covina, CA (US)

(72) Inventors: Yongchun Tang, Walnut, CA (US); Allen Thomas Lyssy, Stockdale, TX (US); Yaser Asgari, Chino Hills, CA (US); Carl W. Aften, Magnolia, TX (US); Hongxin Tang, Walnut, CA (US)

(73) Assignee: CHEMEOR, INC., Covina, CA (US)

( * ) Notice: Subject to any disclaimer, the term of this patent is extended or adjusted under 35 U.S.C. 154(b) by 161 days.

(21) Appl. No.: 16/542,034

(22) Filed: Aug. 15, 2019

(65) Prior Publication Data

US 2019/0367803 A1    Dec. 5, 2019

Related U.S. Application Data

(62) Division of application No. 15/625,958, filed on Jun. 16, 2017, now Pat. No. 10,442,985.
(Continued)

(51) Int. Cl.
*C09K 8/68* (2006.01)
*C09K 8/90* (2006.01)
(Continued)

(52) U.S. Cl.
CPC ............... *C09K 8/68* (2013.01); *C09K 8/588* (2013.01); *C09K 8/685* (2013.01); *C09K 8/882* (2013.01);
(Continued)

(58) Field of Classification Search
CPC .. C09K 2208/12; C09K 2208/32; C09K 8/50; C09K 8/528; C09K 8/588; C09K 8/68;
(Continued)

(56) References Cited

U.S. PATENT DOCUMENTS

| 3,730,275 A | 5/1973 | McClaflin et al. |
| 3,839,500 A | 10/1974 | Dexter |

(Continued)

FOREIGN PATENT DOCUMENTS

| EP | 1767568 | 5/2013 |
| GB | 1361966 | 7/1974 |

(Continued)

OTHER PUBLICATIONS

"Theoretical Studies of Hydrolysis and Stability of Polyacrylamide Polymers," by Qisheng Ma, et al., Elsevier, 121, 2015, pp. 69-77.
(Continued)

*Primary Examiner* — Alicia Bland
(74) *Attorney, Agent, or Firm* — Karish & Bjorgum, PC

(57) ABSTRACT

A dry polymer powder for use in enhanced petroleum recovery without being prehydrated before being added to water or brine to be introduced into a wellhead. The dry polymer powder consisting of at least one of a polyacrylamide, a copolymer of acrylamide and acrylic acid, a galactomannan, or cellulosic polymer or derivatives thereof, and the polymer can be crosslinked or not crosslinked, provided that if they are homo- or co-polymers of acrylic acid, they are not crosslinked. The dry polymer powder has a polymer size range distribution of 6.6%<40 mesh and 85.4% of 40 to 200 mesh and 8%>200 mesh, and wherein the polymer size range ensures that the dry polymer powder will efficiently hydrate in the water or brine within about one minute without forming fisheyes.

12 Claims, 6 Drawing Sheets

Related U.S. Application Data

(60) Provisional application No. 62/351,910, filed on Jun. 17, 2016.

(51) Int. Cl.
  *C09K 8/588* (2006.01)
  *C09K 8/88* (2006.01)
  *C09K 8/528* (2006.01)
  *C09K 8/50* (2006.01)

(52) U.S. Cl.
  CPC .............. *C09K 8/887* (2013.01); *C09K 8/90* (2013.01); *C09K 8/50* (2013.01); *C09K 8/528* (2013.01); *C09K 2208/12* (2013.01); *C09K 2208/32* (2013.01)

(58) Field of Classification Search
  CPC ........ C09K 8/685; C09K 8/882; C09K 8/887; C09K 8/90
  See application file for complete search history.

(56) References Cited

U.S. PATENT DOCUMENTS

| | | | |
|---|---|---|---|
| 4,010,135 A | 3/1977 | Tutein | |
| 4,474,667 A * | 10/1984 | Block | C09K 8/206 507/114 |
| 4,778,836 A | 10/1988 | Farrar et al. | |
| 4,798,888 A | 1/1989 | Symes et al. | |
| 5,190,374 A | 3/1993 | Harms et al. | |
| 5,382,411 A | 1/1995 | Allen | |
| 5,426,137 A | 6/1995 | Allen | |
| 5,849,862 A | 12/1998 | Davies et al. | |
| 5,947,596 A | 9/1999 | O'Dowd | |
| 5,981,446 A | 11/1999 | Qiu et al. | |
| 6,642,351 B1 | 11/2003 | Harlukowicz et al. | |
| 7,939,584 B2 | 5/2011 | Harris et al. | |
| 9,067,182 B2 | 6/2015 | Nichols et al. | |
| 9,328,599 B2 | 5/2016 | Pich et al. | |
| 9,334,438 B2 | 5/2016 | Sullivan et al. | |
| 9,404,033 B2 | 8/2016 | Perry et al. | |
| 2001/0014712 A1 | 8/2001 | Huang et al. | |
| 2003/0051522 A1 | 3/2003 | Arnold et al. | |
| 2004/0256106 A1 | 12/2004 | Phillippi et al. | |
| 2006/0293196 A1 | 12/2006 | Harris et al. | |
| 2009/0023614 A1 | 1/2009 | Sullivan et al. | |
| 2012/0157356 A1* | 6/2012 | Dawson | C09K 8/605 507/219 |
| 2014/0051610 A1 | 2/2014 | Perry et al. | |
| 2014/0054042 A1 | 2/2014 | Pich et al. | |
| 2016/0115373 A1 | 4/2016 | Floyd, III et al. | |
| 2016/0122622 A1 | 5/2016 | Dwarakanath et al. | |
| 2016/0369068 A1* | 12/2016 | Reilly, Jr. | C02F 11/148 |

FOREIGN PATENT DOCUMENTS

| | | |
|---|---|---|
| WO | 2012061147 | 5/2012 |
| WO | 2016201445 | 12/2016 |
| WO | 2016205504 | 12/2016 |
| WO | 2017067695 | 4/2017 |

OTHER PUBLICATIONS

"Friction Reducers Fresh Rheological Insights Married to Performance," by Carl W. Allen, SPE International, SPE Eastern Regional Meeting in Charleston West Virginia, Oct. 21, 2014, SPE 171025, pp. 1-43.

International Search Report and Written Opinion, dated Sep. 13, 2017.

"Dry Polyacrylamide Friction Reducer: Not Just for Slick Water," by Michael Sanders, Ph.D., et al., Society of Petroleum Engineers, SPE Hydraulic Fracturing Technology Conference in the Woodlands, Texas, Feb. 9, 2016, SPE-179146-MS, pp. 1-13.

* cited by examiner

EASILY DISPERSIBLE POLYMER POWDER FOR HYDROCARBON EXTRACTION

CROSS-REFERENCE TO RELATED APPLICATIONS

This divisional patent application claims priority from U.S. patent application Ser. No. 15/625,958, filed on Jun. 16, 2017 and entitled "Easily Dispersible Polymer Powder for Hydrocarbon Extraction", which in turn claims priority from U.S. Provisional Patent Application No. 62/351,910 filed on Jun. 17, 2016 and entitled "Manufacturing Dispersible Powder."

FIELD OF THE INVENTION

The invention relates to the field of making and using easily hydrated polymer powder compositions useful in oil and gas well stimulation, including being added to fresh water or brine to make a carrier fluid to carry proppants for hydraulic fracturing, and in related applications and for related purposes.

BACKGROUND OF THE INVENTION

Hydraulic fracturing of oil- and gas-bearing shale formations for improving hydrocarbon production is an effective method to get more "trapped" oil and gas out of the subsurface, in which fracturing fluid (fresh water, brine, etc.) containing a number of components, including proppant, is injected via high-pressure pumps to increase the permeability of formation. The pressure generated on the surface decreases significantly when the fracturing fluid reaches subsurface fracturing zones, primarily due to the turbulent tendency of fracturing flow under very high Reynolds-number non-Newtonian flowing conditions. Addition of natural or synthetic polymers into the fracturing fluid is a practical way to reduce the pressure drop, also known as the "friction reduction." The polymer additives serving for the purpose of friction reduction in an aqueous-based well stimulation operation are referred to as "fraction reducers", whereas those used in the oil-based pipeline operations are commonly referred to as "drag reducers". The requirement for friction reduction in hydraulic fracturing of oil- and gas-bearing formations is very different than use of friction reducers in transport of oil though pipelines that carry oil over long distances, in which the oil passes and is pumped through various substations. In hydraulic fracturing operations, the fluid must be pumped down into the formation very quickly and under high pressure so that the proppants are forced into fissures in the formation to physically hold open the fissures so that petroleum may be allowed to more readily flow out of the formation. In these operations, the friction reduction must occur very quickly, and typically large volumes of water or brine must be prepared. In contrast, in the field of moving oil though pipelines, friction reducers are added directly to oil to reduce the friction of the oil as it moves through the pipelines for many hours and as the oil passes repeatedly through pumping stations to keep the oil moving. The friction reducers must optimally be able to withstand the repeated action of pumping stations and degradation over time.

Polymer-based friction reducers are composed of high-molecular weight, water-soluble polymers. Examples of these polymers include polyacrylamide, hydrolyzed polyacrylamide, polyacrylamide/acrylate copolymers or those based on such a backbone or on poly(meth)acrylamide and poly(meth)acrylic acid backbones, polyethylene oxide and derivatives thereof, and semi-synthetic polymers such as carboxymethyl cellulose or hydroxy-ethyl cellulose, or the natural-occurring biopolymers such as guar gum.

It has long been recognized that water-soluble friction reducers are easily degraded when exposed to water under high-temperature, high-pressure, high-salinity and/or high-shear conditions. Along with numerous laboratory and field studies to improve the stability of polymers in solution, Ma et al. also conducted systematic theoretical studies based on quantum chemistry computational modeling to insights to of polymer hydrolysis and stability based on energetics calculations. See Ma, et al. in El Sevier Polymer Degradation and Stability, 121 (2015) 69-77, *Theoretical studies of hydrolysis and stability of polyacrylamide polymers*.) To preserve shelf life and for storage purposes prior to use, direct contact of friction reducers with water should be avoided. Several methods can be used to accomplish this. One method is to keep the friction reducer in the dry-powder form. That is, after being synthesized, polymers are separated from solution, dried, purified and often ground into powdered products. Products made by this approach can be referred to as "dry friction reducer", or "DFR". Another approach is to synthesize polymers by inverse emulsion polymerization (oil-external), preserving the water-soluble polymer inside an oil phase. Because a majority of friction reducers are polyacrylamide (PAM), products made by this approach are often referred to as "emulsion PAM-based friction reducers", or "ePAM" for short.

Friction reduction achieves its maximum effect when the friction reducing polymer is fully extended in the aqueous solution but starts to decrease when the polymer degrades. The stability requirements of a polymer depend on the type of field operation. For example, in polymer-augmented waterflooding enhanced oil recovery (EOR) operations, water-soluble polymers often are required to be stable under high-temperature, high-pressure, or high-salinity conditions for several months. Whereas in hydraulic fracturing operations, a major cause of polymer degradation is ultra-high shearing stemming from very high pumping rates, and the required time period for stability of a friction reducer in such as use is often only one or two hours. Another important timing criterion for friction reduction in hydraulic fracturing operations is how fast the polymer can achieve its maximum functionality. For an ePAM product, this is often referred to as "inversion time", that is, the time it takes to break the emulsion for release of the polymers when the ePAM dispersion of suspension is diluted in water. For a DFR product, inversion time is related to the time it takes to for the polymer to be hydrated by water.

The inversion and/or hydration time for of a friction reducer in typical hydraulic fracturing operations often is required to be less than 1 minute. This has imposed a great challenge to the field application of many product candidates, especially because the inversion and/or hydration time is also influenced by a number of field conditions such as temperature and the type and concentration of dissolved salts in the fluid. Fast inversion times (less than 30 seconds) by ePAM can be achieved under fresh/tap water conditions when the active polymer content is limited to 30 weight percentage or less. Additional additives such as surfactants have been used to shorten the inversion time. However, additional material and logistical costs as well as environmental issues of including additional chemicals in fracturing fluids have been a great concern for the ePAM products.

Hydration of solid powder polymers can be challenging for use in fracking operations as they tend not to dissolve quickly enough. U.S. Pat. No. 9,334,438 provides a good overview of the hydration problem and how current oil service industries have dealt with this issue. Pre-hydration of the polymer powder in a mixing unit is often required. A variety of mechanical devices have been disclosed in previous work. Examples include, but not limited to, U.S. Pat. Nos. 5,190,374, 5,382,411, 5,426,137, 5,947,596, and 5,981, 446, as well as more complex commercial units such as the precision continuous mixer or programmable optimum density blender disclosed in U.S. Pat. No. 9,334,438. In U.S. Pat. Publ. 2012/0157356, Dawson et al. also disclose conceptual designs for batch mixing in a continuous process blending equipment.

For cost-effective application of DFR in hydraulic fracturing operations or stimulation operations, what is needed is the direct feeding scheme of DFR into the fracturing fluids without the prior art pre-hydration step, as illustrated in FIG. 1, a procedure that is often referred to as addition "on-the-fly", which is currently only available for select ePAM products. When using a dry powder product, the most difficult hurdle to overcome is achieving ultra-fast hydration of DFR in an aqueous fluid, ideally in less than 1 minute, in water, without, at the same time, suffering the formation of so-called "fisheyes", as described further below.

Fundamental flow rheology theory teaches that the hydration time of dry powders is proportional to their active water contact surface area, and that the reduction of the particle size can affect the hydration rate. U.S. Pat. No. 3,730,275 discloses that by including various sizes of particles, the shear degradation rate of friction reducers can be modified. In particular, U.S. Pat. No. 3,730,275 discloses a dry powder with preferred particle sizes as follows: At least 20% by weight within a size range of 5 to 30 mesh (or 4000~595 microns), at least 20% by weight within a size range of 40 to 90 mesh (or 420~163 microns), at least 20% by weight within a size range of 100 to 200 mesh (or 149~74 microns), and with any remaining powder of 0% to 40% being in a size range of 5 to 300 mesh (or 4000~74 microns). The purpose for this prior art disclosure is to provide friction reduction yet withstand shear degradation of polymer. Thus at least 20% by weight of the particles are greater than 30-mesh (~600 microns), while particles smaller than 40-mesh account for at most 80% by weight. The particle size range is very broad, that is, from about 74 to 4000 microns. The '275 reference does not disclose or discuss any hydration times by its polymer mixtures. (The term "micron" herein and throughout is equivalent to the SI-recommended "micrometer," abbreviated "μm.")

Attempts to simply reduce the particle size of friction reducers do not necessarily result in the improvement of the shortening hydration time. Indeed, it has been found that particles with too fine a size tend to aggregate or agglomerate upon contact with water to form globules or the so-called "fisheyes", which are very difficult to (re-)hydrate. U.S. Pat. Nos. 5,849,862 and 6,642,351 disclose that the agglomerated forms of precipitates of smaller particles dissolve more slowly than those of larger particles. U.S. Pat. No. 3,839,500 discloses that in order to have very few lumps during dissolution and have the powder well dispersed, the dry powder mixture should have less than about 5% by weight of particles of a size smaller than 44 mesh (~370 microns), with most particles between 16 and 44 mesh (or 1190~370 microns), and the polymer powders are made from "various block polymers of mixtures of ethylene and propylene oxides".

Notwithstanding disclosures of particle sizes of polymer dry powders influencing their dispersibility or degradation t, it has been unexpectedly discovered that a very short hydration time, viz. about 1 minute or less, and near complete dispersibility leading to significant maximum friction reduction efficiency can be achieved simultaneously using a dry powder polymer, rendering direct injection of DFR possible. The direct or on-the-fly injection of DFR has been believed to be very difficult if not impossible to achieve in well stimulation operations, such that ePAM remains the major friction reducer type in current markets.

SUMMARY OF THE INVENTION

The present invention provides a method to directly feed a dry water-soluble polymer-based friction reducer as additive into the well stimulation fluids without the use of special dilution equipment and methodologies. The hydration time of the polymer powders in water is sufficiently shortened to less than 1 minute, such that the added on-the-fly operation mode can be achieved, without any pre-hydration operations. The fast hydration rate of the polymer particles is achieved by carefully choosing the size of the polymer particles to be within a narrow range.

In the preferred embodiment, this invention provides a polymer in dry granular form selected from polyacrylamide, related polymers comprising acrylamide units, or other polymers; said polymer having at least 90% by weight of particles sized smaller than 300 microns (~50 mesh), and sized greater than 100 microns (~150 mesh). The polymers of the invention are not ePAM products.

In the preferred embodiment, this invention further discloses that the use of the dry friction reducer in the hydraulic fracturing operations not only could have cost-saving and logistical advantages, but also could have superior friction reduction performance, compared to the conventional oil-external emulsion-based friction reducers.

In another embodiment the invention provides a dry polymer powder for use in the petroleum industry for enhanced petroleum recovery, comprising dry polymer powder sized between two size limits, namely at least about 85 wt % of particles of a size smaller than 40-mesh, and at least 75 wt % of particles of a size greater than 200-mesh.

In yet another embodiment, there is provided a dry polymer powder for use in the petroleum industry for enhanced petroleum recovery, comprising a dry polymer powder selected from the group consisting of at least one of a polyacrylamide, a copolymer of acrylamide and acrylic acid, a functionalized derivative of said polyacrylamide or copolymer, a galactomannan, or a cellulosic polymer or derivatives thereof, wherein the polymer can be crosslinked or not crosslinked, provided that if they are homo- or co-polymers of acrylic acid, they are not crosslinked, wherein the dry polymer powder is sized between two size limits, namely at least about 85 wt % of particles of a size smaller than about 40-mesh, and at least 75 wt % of particles of a size greater than 200-mesh.

In a further embodiment, there is provided a method for using a dry polymer powder for use in the petroleum industry for enhanced petroleum recovery, the dry powder comprising a dry polymer powder sized between two size limits, namely at least about 85 wt % of particles of a size smaller than 40-mesh, and at least 75 wt % of particles of a size greater than 200-mesh. as a friction reducer in fracking water, the method comprising adding the dry polymer powder directly to a stream of fresh water or brine without pre-hydrating the dry power before introducing it to fresh water or brine.

These and other features of the invention are described below.

DETAILED DESCRIPTION

Figure 1:
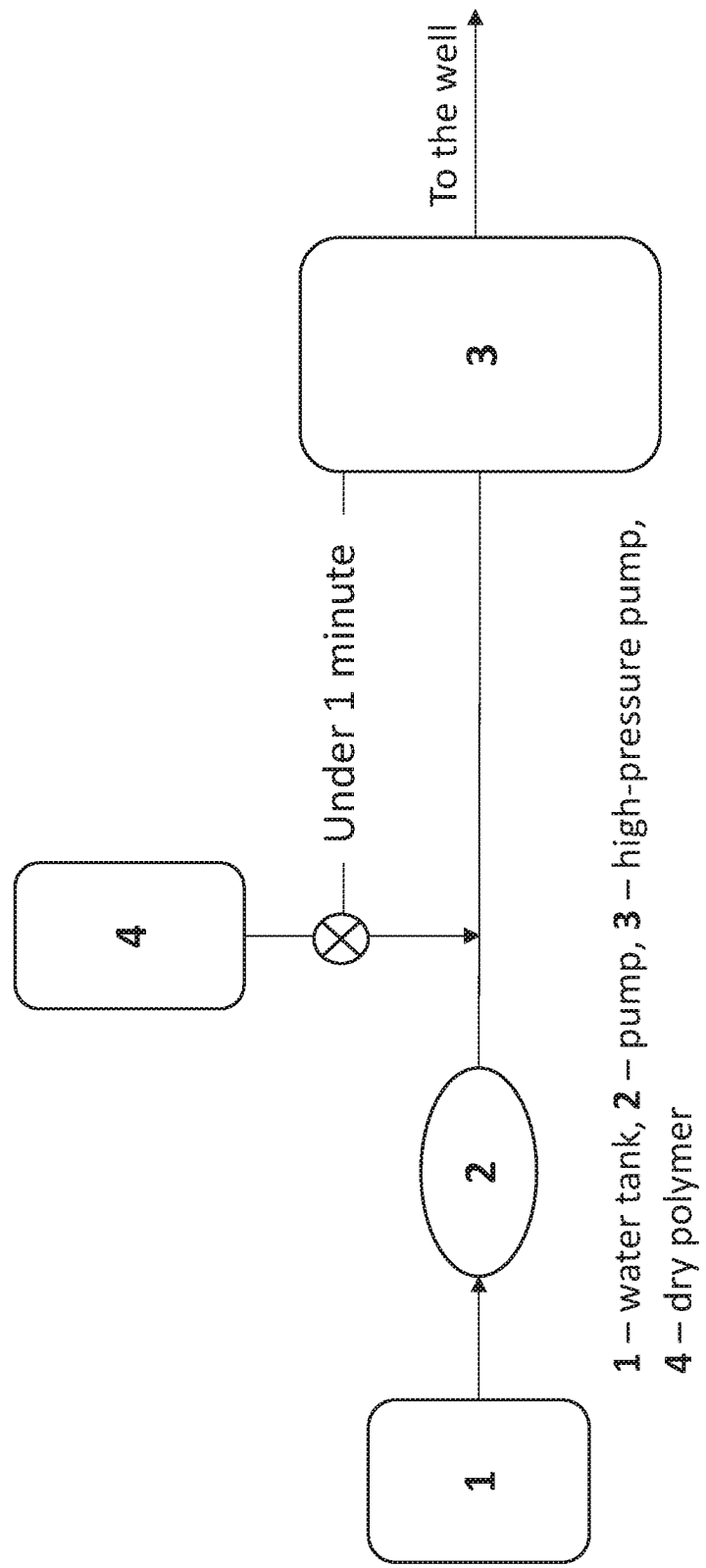
FIG. 1 is a diagrammatic sketch of the added on-the-fly operation mode to directly introduce dry friction reducer powder into main hydraulic fracturing fluids just prior to be pumped by high pressure pumps to a well's borehead.
Figure 2:
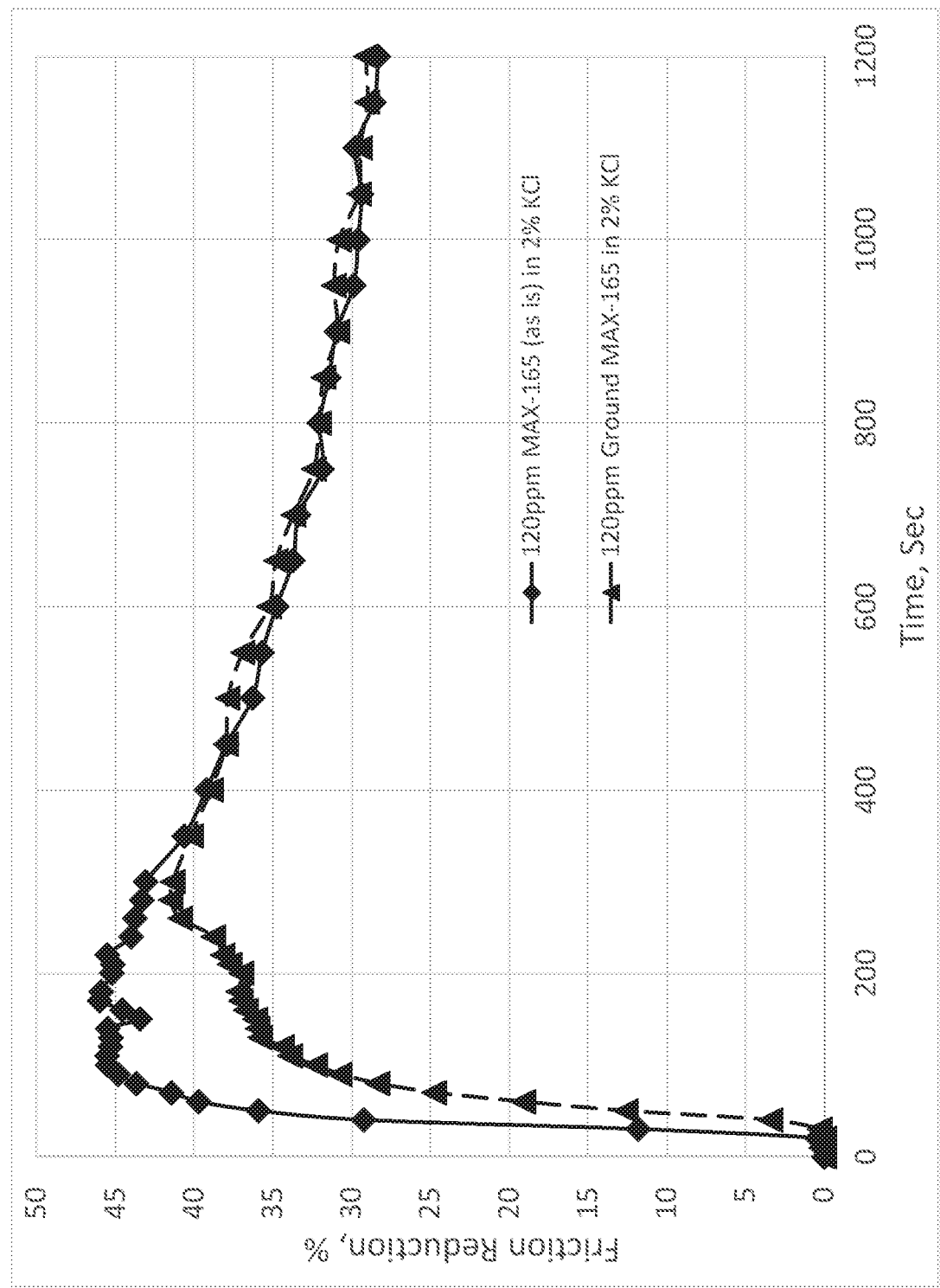
FIG. 2 is a plot of friction reduction performance versus time of the ground MAX-165 and its precursor MAX 165.
Figure 3:
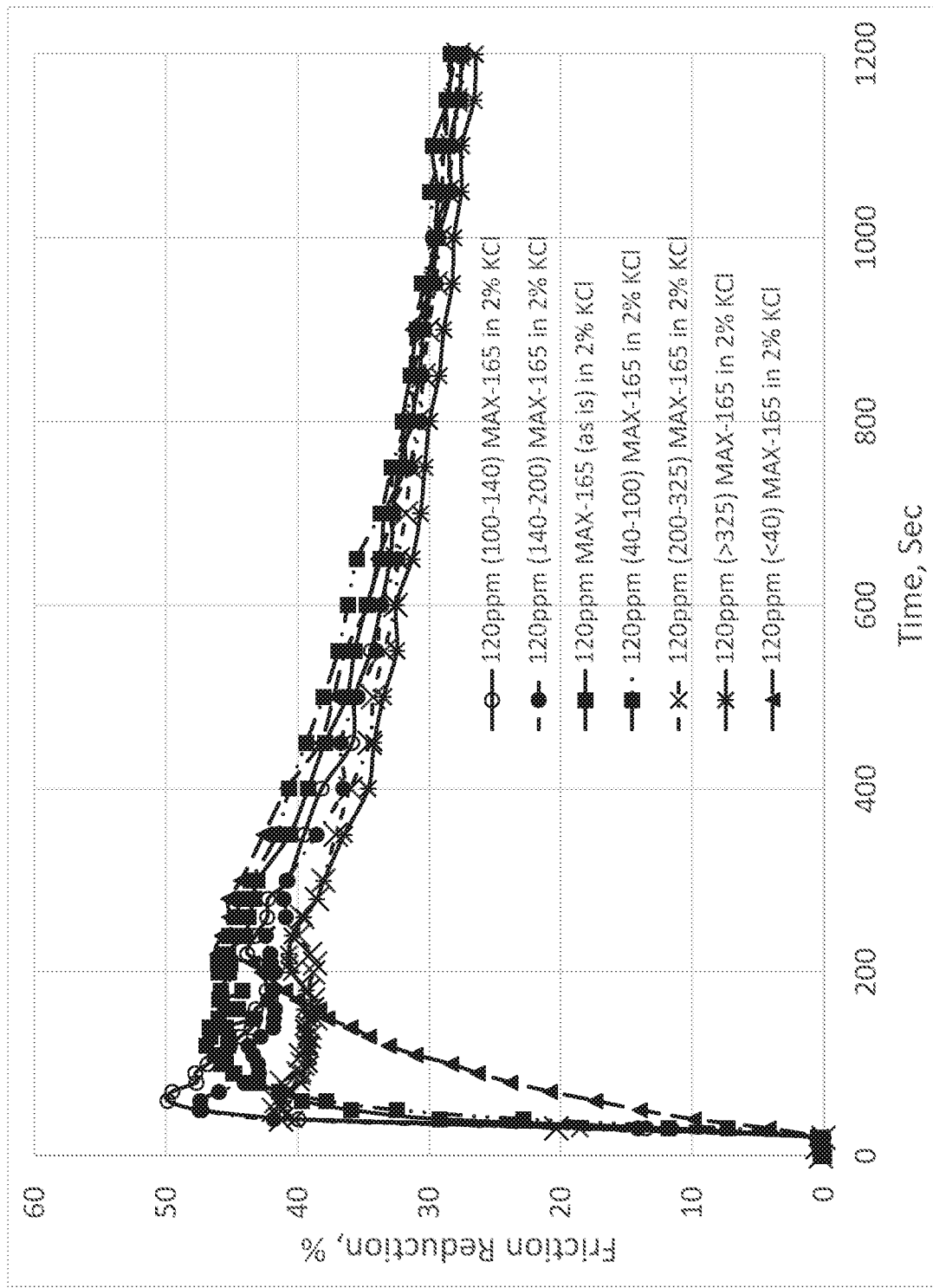
FIG. 3 is a plot of friction reduction performance versus time of the dry polymer powder at specifically selected particle size zones.
Figure 4:
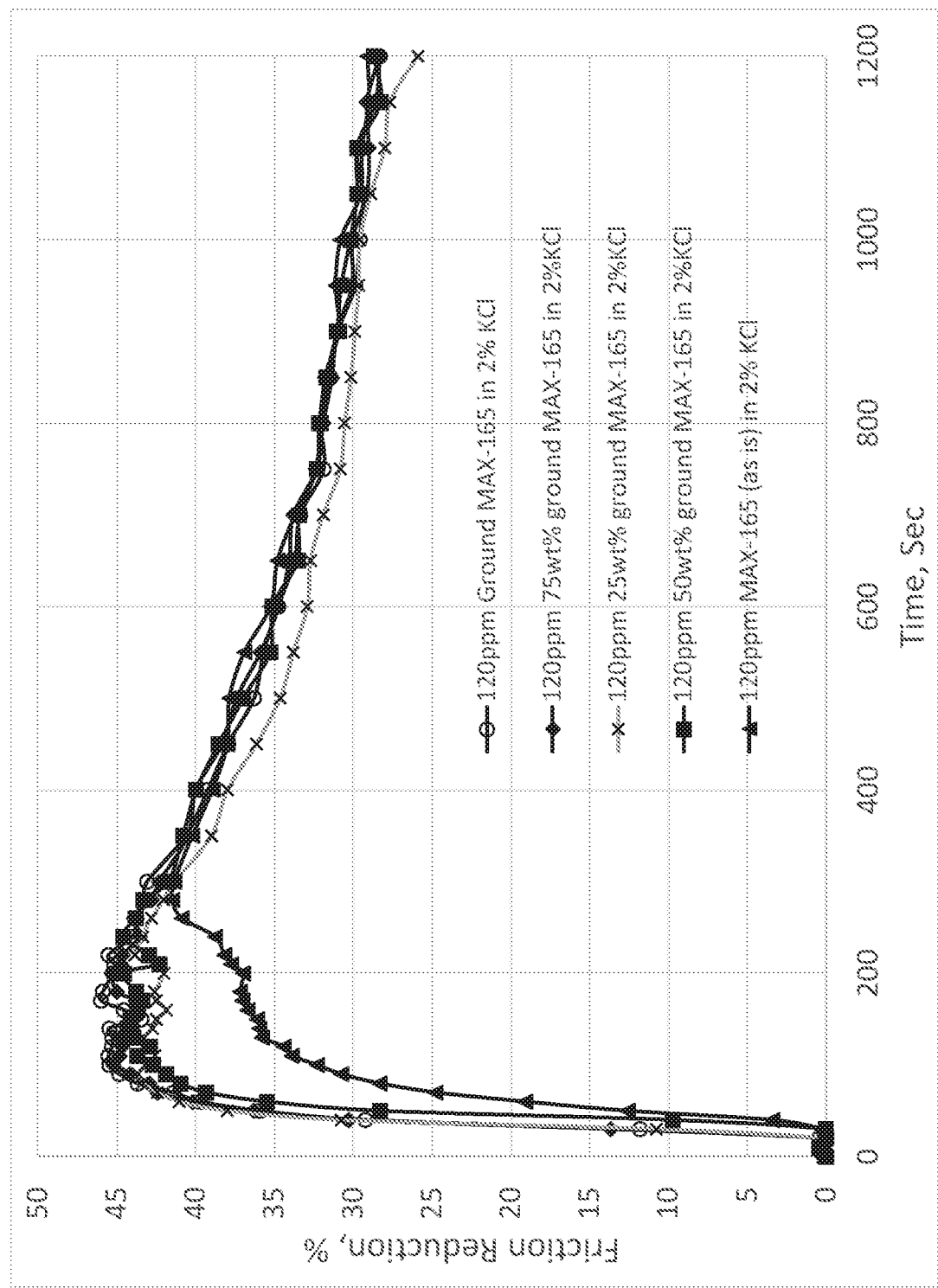
FIG. 4 is a plot of friction reduction performance versus time of the ground MAX-165 at various concentrations mixing with 2% KCl.
Figure 5:
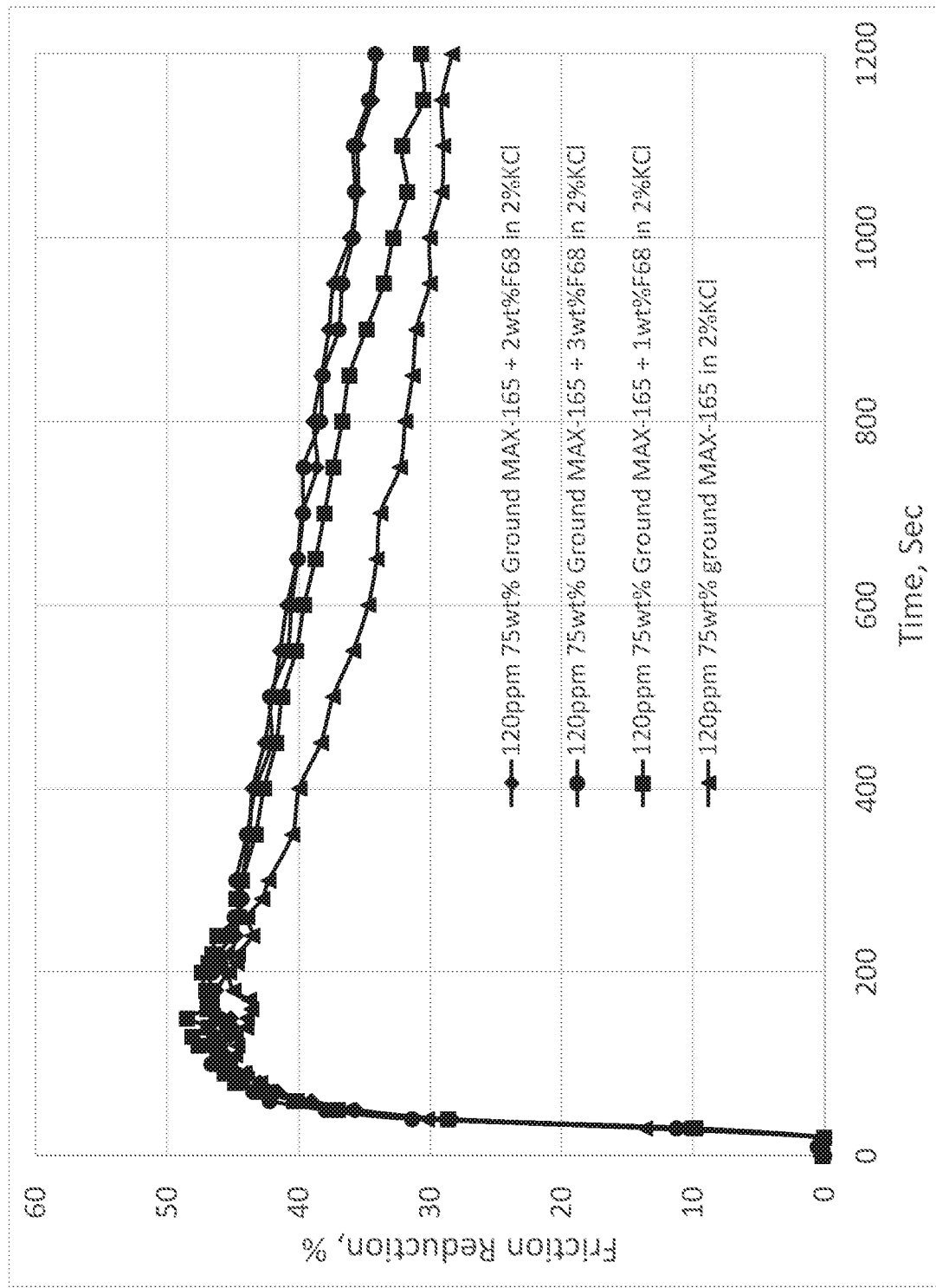
FIG. 5 is a plot of friction reduction performance versus time of the ground MAX-165 and salt mixture in the presence of different concentrations of selected surfactant.
Figure 6:
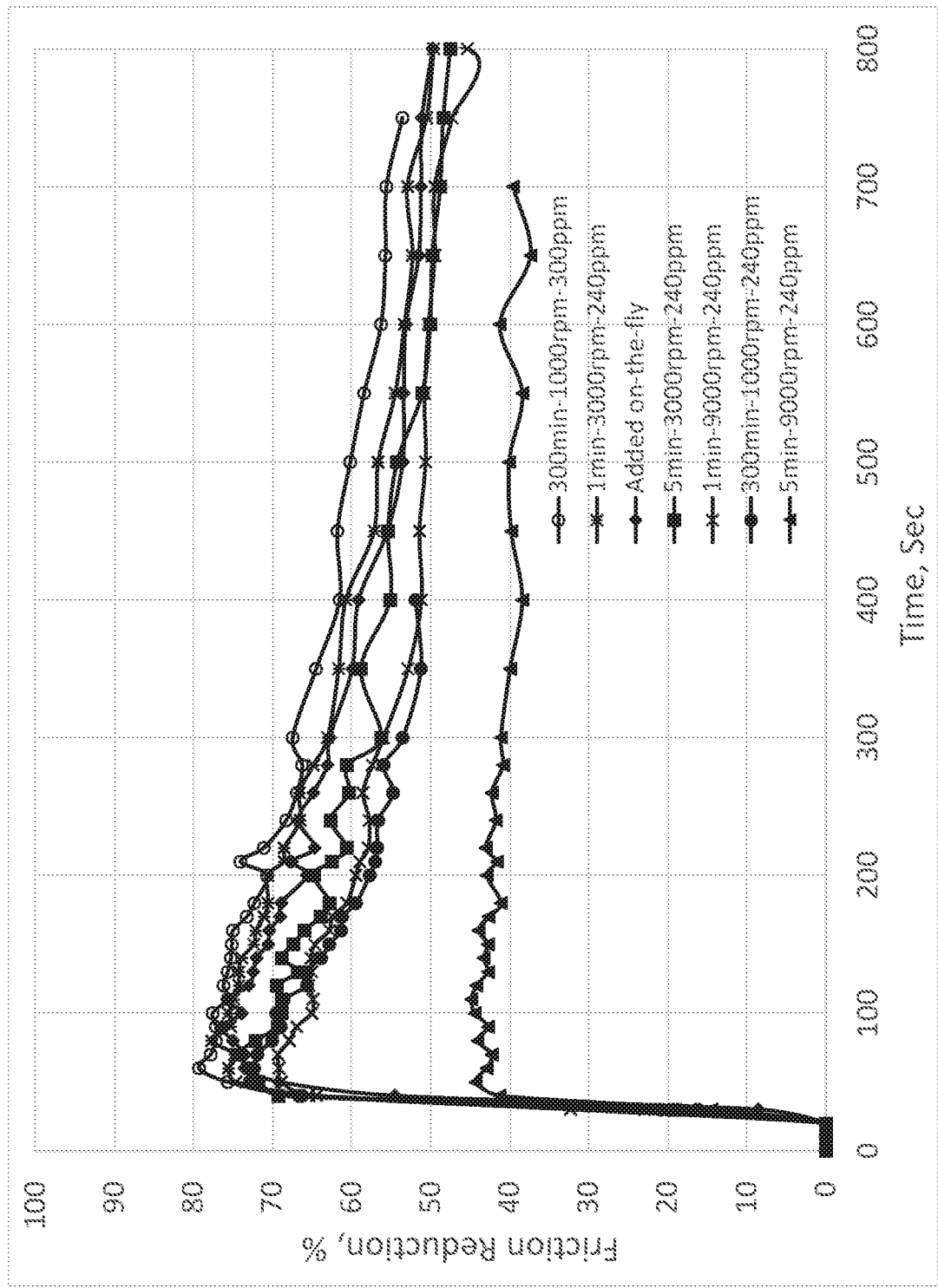
FIG. 6 is a plot of friction reduction performance versus time of the ground MAX-165 under various pre-hydration conditions.

In certain embodiments, the polymer powder is sized between two size limits, namely at least 86, 90, or 95 wt %, or any wt % between any two of these values, of particles of a size smaller than 40-mesh (~425 microns), and at least 76, 80, 85, 90, or 95 wt %, or any wt % between any two of these values, of particles of a size greater than 200-mesh (~75 microns). All references used herein for mesh sizes of the invention are in ASTM/U.S. Standard sizes.

In one embodiment, the polymer powder having at least 85 wt % of particles of a size smaller than 40-mesh (~425 microns) and at least 75 wt % of particles of a size greater than 200-mesh (~75 microns) have particles selected from −40+60 mesh (~425 to ~250 microns), −60+100 mesh (~205 to ~150 microns), −100+140 mesh (~150 to ~106 microns), or −140+200 mesh (~106 to ~75 microns). In some embodiments, the proportion of polymer particles smaller than 100 mesh (~150 microns) is greater than 10%, 20%, 30%, 40%, or 50% by weight of the total polymer particles or a percentage between any two of these. In some embodiments, the proportion of polymer particles between 60-mesh and 100-mesh (~205 to ~150 microns) is greater than 10%, 20%, or 30% by weight of the total polymer particles or a percentage between any two of these.

In some embodiments, inversion time is less than about 60 s, 50 s, 40 s, 30 s, 20 s, or 15 s, or a value between any two of these. In some embodiments, maximum friction reduction efficiency achieved is greater than 40%, 42%, 44%, 46%, 48%, or 50%, or a percentage between any two of these. In some embodiments, friction reduction efficiency at 20 min is greater than 25%, 26%, 27%, 28%, 29%, or 30%, or a percentage between any two of these.

The dry polymer can be polymerized by any suitable method known in the art. In certain embodiments, the polymer is polyacrylamide or a copolymer of acrylamide and acrylic acid, or functionalized derivatives thereof. The functionalization consists in incorporating charged (anionic, cationic, amphoteric) or pendant hydrophilic or hydrophobic groups onto the polymer backbone. This can be achieved by adding specialty monomers during polymerization or carrying out further reactions post polymerization. In one embodiment, the polymer is polyethylene oxide or derivatives thereof. In another embodiment, the polymer is a galactomannan or cellulosic polymer or derivatives thereof. The polymers can be crosslinked or not crosslinked, provided that if they are homo- or co-polymers of acrylic acid, they are not crosslinked. Particles of mesh −40, +100 (between ~425 and ~150 microns) may comprise greater than about 25% by weight of the total polymer in dry form in certain embodiments.

While dry polymer in the size ranges noted above will provide exceptional functionality as a friction reducer without additives, the addition of water soluble electrolytes/salts and block polymers can be beneficial in the formulations of the invention.

Accordingly, one or more water-soluble electrolytes/salts in finely divided form include without limitation salts of alkaline and alkaline earth metals and ammonia salts or salts of water-soluble amines can optionally be added to the formulation. In some embodiments the salts are the sodium, potassium, and ammonium salts of anions such as chlorides, sulfates, phosphates, acetates, formates, and methanesulfonates. Salts should be in finely divided form. In one aspect, salts in finely divided form have a particle size less than about 500 microns.

The optional block polymer is a block polymer nonionic surfactant that is, however, not a silicone surfactant. The block polymer should not be confused with the polymer in dry form, the latter being generally a high molecular weight polymer. In some embodiments, the block polymer is a triblock copolymer composed of both ethylene oxide and propylene oxide units, and variously known or branded as Poloxamer, Pluronic® (BASF), Antarox® (Solvay), Synperonic (Croda), Epan (DKS), and by other names from other suppliers. Certain embodiments of the invention can further comprise surface active agents other than block polymer nonionic surfactants.

Friction reduction efficiency is determined by a loop test well known in the art using inventive compositions with a polymer concentration at for example around 1 pound per thousand gallons (pptg) or around 0.012 wt %. Persons skilled in the art would understand that friction reduction can be achieved at other dilute polymer concentrations.

Embodiments of the invention may further contain other solid additives and chemicals known to be commonly used in oilfield applications by those skilled in the art, in sufficient amounts as to be useful for a treatment fluid in such applications. These include, but are not necessarily limited to, materials such as oxygen scavengers, scale inhibitors, corrosion inhibitors, fluid-loss additives, bactericides, clay stabilizers, surfactants (in dry form, possibly absorbed or adsorbed onto an inactive support material) to reduce capillary pressures or surface tension, and the like. Non-limiting examples of some suitable scale inhibitor include phosphonate, phosphate esters, and the like. Any suitable biocides may be used in embodiments of the invention.

The polymers of the present embodiments should have a molecular weight (MW) sufficient to provide a desired degree of friction reduction or ability to increase viscosity of the aqueous-based hydraulic fracturing fluid. They may have a weight average MW in the range from about 500,000 g/mol to about 60,000,000 g/mol, as determined by intrinsic viscosity methods. The one or more block polymer surfactants may have a hydrophilic-lipophilic balance (HLB) of at least 6, at least 12, or at least 20 (or values between these), and may be added as a mixture of surfactants having different HLB values.

In some embodiments of the invention the acrylamide monomer accounts for 10 mole % to 95 mole % of the polymer in the polymerization reaction, or 10 mole % to 70 mole % in some embodiments, and the one or more other monomers, including for example, (meth)acrylic acid or various acrylic sulfonic acids and salts thereof, account for 1 mole % to 60 mole % of the polymerization reaction, or 5 mole % to 40 mole % in some embodiments. In other embodiments, the one or more specialty monomers used for functionalization, including hydrophobic monomers, account for 0.5 mole % to 20 mole % of the polymer in the polymerization reaction, or 1 mole % to 10 mole % in certain embodiments. Acrylates can result from acrylamides by caustic hydrolysis, and quaternary ammonium groups can result from quaternization of tertiary amines. The mole percentages of polymer units in a polymerized product of the present invention can be described by the same mole percentages provided herein to characterize monomer incorporation. The polymerization reaction can be carried out by methods known in the art, for example free radical chain polymerization, employing suitable initiators and redox initiation systems.

The polymers of the present embodiments should be included in the solution or dispersion in an amount sufficient to provide the desired friction reduction or other functions. In some embodiments, polymers comprise at least 0.005% by weight of the solution or dispersion. In some embodiments, polymers account for a percentage by weight of the solution or dispersion total that is 0.006%, 0.008%, 0.01%, 0.012%, 0.014%, 0.016%, 0.018%, 0.02%, 0.022%, 0.024%, 0.026%, 0.028%, 0.03%, 0.035%, 0.04%, 0.045%, 0.05%, 0.1%, 0.2%, 0.3%, 0.4%, or 0.5%, or any percentage by weight in a range delimited by any two of these. Different relative amounts, or ratios, of the polymer in dry from to the water-soluble salt or block polymer surfactant are effective. In one embodiment, the ratio by weight of the polymer to the optional water-soluble salt is in the range of about 4:1 to about 1:4.

In other embodiments, the composition comprising polymer powder, water soluble salts, and block polymer surfactants may be combined with an aqueous diluent to form a treatment fluid. Examples of the aqueous diluent include, but are not limited to, DI water, fresh water, brine, seawater, flowback water, produced water, and recycled water. Present embodiments of both the composition and method can be practiced at a temperature ranging from about 10° C. to about 120° C., and especially from about 20° C. to about 95° C.

EXAMPLES

Detailed friction reduction performance evaluation procedure has been published in our recent presentation to the Society of Petroleum Engineers (SPE-171025). Specifically, friction reduction was evaluated using a recirculating flow loop. A constant high rate of flow is maintained for a testing fluid in the loop, which in Applicant's apparatus comprises two tubing sizes, 1 inch (~2.54 cm) and ¾ (~1.9 cm). Two different sets of pressure transducers on the loop measure pressure differentials across a 10 foot (~3 m) test section of the ¾ inch (~1.9 cm) tubing. Other than the loop itself, the loop assembly consists of one 6.9 U.S. gallon (~26 L) reservoir with an overhead mixer, a progressive cavity pump usually operated to supply 65 psi of pressure, a flow meter, and a data acquisition unit. Fluids were pumped at 25 U.S. gallons per min (~94.6 L/min). All tests were performed at ambient temperature. In this procedure, the reservoir was first filled with tap water, then KCl slowly added to 2% by weight and recirculation allowed to continue for 5 min for complete salt dissolution. Thereafter the Applicant started to collect pressure difference across the test section versus time. Data for the untreated brine served as a baseline. A sample was then loaded into the reservoir at 120 ppm, or other concentrations as specified in each case, and pressure difference data again collected.

Three performance parameters are calculated from the percentage friction reduction (% FR) versus time, which is determined using the following equation: % FR=(dP untreated fluid−dP treated fluid)/dP untreated fluid*100 (Equation 1), where dP means the pressure difference across the loop's test section. These three parameters are (i) the maximum friction reduction (Max FR), which is the maximum % FR that can be attained; (ii) inversion/hydration time (T_inv), which is defined as the time it takes to reach 90% of Max FR; and (iii) the friction reduction after 20 minutes (FR20), which is the % FR still maintained after 20 minutes.

In the field of fracking, the so-called base fluid/carrier is almost never fresh water alone, but typically is a brine solution—indeed the formation water is a brine. 2% KCl is a simple way in laboratory studies to mimic this reality and is represented in Examples 1-5. Thus, this small percentage should be considered as a "base" or "background" level of salt, not extra salt. In some studies a more complex mixture of salts or total dissolved solids (TDS) are made or obtained, up to 7 or 10%. However, 20%~25% total added salt NaCl (see Examples 4 and 5) would be considered extra salt, going above and beyond a "base" or "background" level.

The procedure for the dissolution and fisheyes tests are as follows: 2000 ppm active selected polymer was poured into 250 mL distilled water at 500 rpm and stirred for 1 minute; then the resulting solution was poured through a screen (about 20 mesh), then rinsed with 2000 mL tap water; the residual solid contents (if any) on the screen were collected and transferred onto a clean foil pan; the foil pan was dried for 2.5 hours in an 80° C. oven to observe the formation and the size or quantity of solid gel (if any).

Example 1

A commercial polyacrylamide-based dry polymer powder, MAX-165, offered by the Applicant ChemEOR, Inc. was used as the baseline. Particulars on the particle size distribution of the batch/lot of MAX-165 tested are as follows: Mesh <40 mesh=50.3%; 40 to 100 mesh=38.2%; 100 to 140 mesh=10.9%; 140 to 200 mesh=0.2%; 200 to 325 mesh=0.2%; and >325 mesh=0.2%. Friction reduction performances of polymer powders with selected range of particle sizes were summarized as follows. All tests were conducted with 120 ppm active polymer in 2% KCl solution (to mimic a typical background level of salinity.)

| Range of Particle Size | Max FR | T_inv | FR20 |
|---|---|---|---|
| MAX 165 as is | 41.51 | 70 | 29.13 |
| <40 mesh | 46.18 | 120 | 27.61 |
| 40-100 mesh | 47.01 | 55 | 28.24 |
| 100-140 mesh | 49.9 | 26 | 27.67 |
| 140-200 mesh | 47.56 | 21 | 27.41 |
| 200-325 mesh | 41.94 | 15 | 27.74 |
| >325 mesh | 41.51 | 15 | 26.49 |

The dissolution and fisheyes testing results as summarized as follow:

| Range of Particle Size | Fisheye | Undissolved Particle | Dry Weight of Fisheyes (g) |
|---|---|---|---|
| <40 mesh | No | Yes | 0 |
| 40-60 mesh | No | Yes | 0 |
| 60-100 mesh | No | No | 0 |
| 100-140 mesh | Yes | No | 0.068 |
| 140-200 mesh | Yes | No | 0.221 |
| 200-325 mesh | Yes | No | 0.180 |
| >325 mesh | Yes | No | 0.235 |

These data show that shorter hydration time can be attained by reducing the particle sizes of polymers; and the smaller the particle sizes are, the shorter the hydration time can be attained. In particular, the hydration time is less than 1 minute when the particle size of polymers is smaller than 40 mesh (420 microns). However, the dissolution rate and the tendency of the fisheyes formation are in conflict. When the particle sizes become smaller, the tendency to form fisheyes increases. These data also show that there exists a narrow range of the particle size, within which the hydration time is less than 1 minute and there will not be formation of fisheyes. The range is within 60-100 mesh, or 150~250 microns.

Example 2

A polymer composition was tested for friction reduction performance having particles 93.4% by weight of a size smaller than 40 mesh (420 microns), and 92% by weight of a size greater than 200 mesh (74 microns), wherein particles of sizes from 40 to 200 mesh comprise 85.4% by weight of the total. A hydration time of less than 1 min was attained, and no fisheyes formation observed. The test was conducted with 120 ppm active polymer in 2% KCl solution.

| Range of Particle Size | Max FR | T_inv | FR20 |
|---|---|---|---|
| Ground MAX-165 (93.4% −40 mesh; 92% +200 mesh; 85.4% −40 +200 mesh | 45.71 | 48 | 28.58 |

These data show that by eliminating larger particle sizes, that is, in particular, those of particle sizes greater than 40 mesh, in the dry polymer composition, a sufficiently short hydration time of less than 1 minute is achievable. By simultaneously also eliminating those very fine particle, in particular of sizes smaller than 200 mesh, the formation of fisheyes can be avoided. Thus, a dry polymer composition having a great majority of polymer particles sized between about 40 to 200 mesh results in a composition that has exceedingly fast inversion times without formation of fisheyes.

Example 3

The polymer composition of EXAMPLE 2, herein denoted as "Ground MAX-165", is blended with various concentrations of the NaCl salt. All percentages are by weight, and all tests were conducted at 120 ppm active polymer in 2% KCl solution. No fisheye formation was observed in any of these tests. These data show that the addition of salt substantially improves polymer hydration.

| Range of Particle Size | Max FR | T_inv | FR20 |
|---|---|---|---|
| 25% Ground MAX-165 + 75% NaCl | 43.92 | 35 | 26.67 |
| 50% Ground MAX-165 + 50% NaCl | 44.81 | 46 | 28.69 |
| 75% Ground MAX-165 + 25% NaCl | 45.22 | 44 | 28.56 |

Example 4

Various concentrations of a surfactant, Pluronic® F-68, a nonionic oligomeric surfactant powder (offered by BASF Corporation), are added to a polymer-salt mixture composition. The positive effect of the surfactant additive on polymer hydration as exhibited by shortened T_inv's is surfactant concentration dependent. Adverse effect seen in terms of Max FR decrease is relatively small. A small amount of this type of surfactant, up to 3% at least, can substantially improve polymer hydration.

| Range of Particle Size | Max FR | T_inv | FR20 |
|---|---|---|---|
| Ground MAX-165 + 25% NaCl + 1% F68 | 48.68 | 57 | 30.32 |
| Ground MAX-165 + 25% NaCl + 2% F68 | 45.93 | 49 | 33.75 |
| Ground MAX-165 + 25% NaCl + 3% F68 | 46.68 | 40 | 34.46 |

Example 5

Conventional dry polymer products are also subject to conventional handling, which requires pre-hydration. In this example, an 80% Ground MAX-165+20% NaCl mixture is either added on the fly (inventive—first line in table below) or pre-hydrated (and as part of the standard pre-hydration practice first sheared for various times). Their performance is compared. Under fresh water condition, higher polymer concentrations (240-300 ppm) are used. Runs lasted 400 seconds (~6.6 minutes) to test the effect of pre-hydration under shearing on Max FR and T_inv. FR20 was not tested.

| Condition | Polymer Concentration (ppm) | Pre-hydration shear rate (RPM) | Max FR | T_inv | RF20 |
|---|---|---|---|---|---|
| Unhydrated "on-the-fly" polymer powder | 240 | — | 76 | 30 | — |
| 1 minute pre-hydration | 240 | 3000 | 78 | 27 | — |
| 1 minute pre-hydration | 240 | 9000 | 70 | 22 | — |
| 5 minute pre-hydration | 240 | 3000 | 75 | 21 | — |
| 5 minute pre-hydration | 240 | 9000 | 44 | 20 | — |
| 300 minute pre-hydration | 240 | 1000 | 66 | 20 | — |
| 300 minute pre-hydration | 300 | 1000 | 68 | 19 | — |

Under low shearing conditions (1000~3000 RPM), the negative effect of hydration on decreased Max FR is relatively small. Even after 5 hours of hydration at 1000 RPM shearing, only about 10% in Max FR reduction was observed. However, high shearing had more significant adverse effects on Max FR. At 9000 RPM shearing, even 5 minute of pre-hydration significantly reduces MAX FR, by more than 40%. Polymer powders begin to dissolve during the pre-hydration process and are subject to shear degradation.

Example 6

The dry polymer powders (80% Ground MAX-165+20% NaCl) is pre-hydrated at 1000 RPM for 300 minute (5 hours), then friction reduction performance tests are carried out in API (American Petroleum Industry) brine (which is water with 8% NaCl+2% $CaCl_2$) to mimic heavy brine) and compared with the performance of the same polymer powder added on-the-fly. The main focus of this example is to compare initial friction reduction performance, only 400 seconds (~6.6 minutes) runs were conducted in these tests, so there are not FR20 data given. Under the API (American Petroleum Industry) brine condition, the added on-the-fly mode has better friction reduction performance than the long-time pre-hydration mode. After long-time exposure to various cationic compounds in the API brine, polymers degrade even under relatively slow shearing. Therefore, under heavy brine conditions, such as those recycling the flowback water or produced water, the added on-the-fly mode of the dry friction reducer will perform better than the pre-hydration mode.

| Condition | Polymer Concentration (ppm) | Pre-hydration shear rate (RPM) | Max FR | T_inv | RF20 |
|---|---|---|---|---|---|
| on-the-fly | 240 | — | 42 | 37 | — |
| 300 minute pre-hydration | 240 | 1000 | 9 | 44 | — |

Accordingly, as can be appreciated from the Example above. The preferred embodiments of this invention have been disclosed, however, so that one of ordinary skill in the art would recognize that certain modifications would come within the scope of this invention.

What is claimed is:

1. A dry polymer powder for use in the petroleum industry for enhanced petroleum recovery, comprising dry polymer powder with a polymer size range distribution of 6.6%<40 mesh and 85.4% of 40 to 200 mesh and 8%>200 mesh as a friction reducer for addition directly to a stream of fresh water or brine used as fracking water.

2. The dry polymer powder of claim 1, wherein the polymer size range distribution ensures that the dry polymer powder will efficiently hydrate in the water or brine within about one minute without forming fisheyes.

3. The dry polymer powder of claim 1, further comprising at least one additive selected from the group consisting of water soluble electrolytes/salts, oxygen scavengers, scale inhibitors, corrosion inhibitors, fluid-loss additives, bactericides, clay stabilizers, and surfactants.

4. The dry polymer powder of claim 3, wherein the surfactant comprises a block polymer nonionic surfactant.

5. The dry polymer powder of claim 3, wherein the water soluble electrolytes/salts comprise alkaline and alkaline earth metals and ammonia salts or salts of water-soluble amines, sodium, potassium, and ammonium salts of chlorides, sulfates, phosphates, acetates, formates, and methanesulfonates.

6. The dry polymer powder of claim 1, wherein the dry polymer powder comprises at least one of a polyacrylamide, a copolymer of acrylamide and acrylic acid, a galactomannan, or a cellulosic polymer or derivatives thereof, wherein the polymer can be crosslinked or not crosslinked, provided that if they are homo- or co-polymers of acrylic acid, they are not crosslinked.

7. The dry polymer powder of claim 1, wherein the proportion of polymer particles smaller than 100-mesh is between 10% and 50% of the total polymer particles.

8. The dry polymer powder of claim 1, wherein the proportion of polymer particles between 60-mesh and 100-mesh is between 10% and 30% of the total polymer particles.

9. A dry polymer powder for use in the petroleum industry as a friction reducer for addition directly to a stream of fresh water or brine used as fracking water for enhanced petroleum recovery, comprising a dry polymer powder selected from the group consisting of at least one of a polyacrylamide, a copolymer of acrylamide and acrylic acid, a galactomannan, or a cellulosic polymer or derivatives thereof, wherein the polymer can be crosslinked or not crosslinked, provided that if they are homo- or co-polymers of acrylic acid, they are not crosslinked, wherein the dry polymer powder has a polymer size range distribution of 6.6%<40 mesh and 85.4% of 40 to 200 mesh and 8%>200 mesh, and wherein the polymer size range ensures that the dry polymer powder will efficiently hydrate in the water or brine within about one minute without forming fisheyes.

10. The dry polymer powder of claim 9, further comprising at least one additive selected from the group consisting of water soluble electrolytes/salts, oxygen scavengers, scale inhibitors, corrosion inhibitors, fluid-loss additives, bactericides, clay stabilizers, and surfactant.

11. The dry polymer powder of claim 10, wherein the surfactant comprises a block polymer nonionic surfactant.

12. The dry polymer powder of claim 10, wherein the water soluble electrolytes/salts comprise alkaline and alkaline earth metals and ammonia salts or salts of water-soluble amines, sodium, potassium, and ammonium salts of chlorides, sulfates, phosphates, acetates, formates, and methanesulfonates.

* * * * *